(12) United States Patent
Kato et al.

(10) Patent No.: US 7,655,064 B2
(45) Date of Patent: Feb. 2, 2010

(54) PARTICULATE MATTER-CONTAINING EXHAUST EMISSION CONTROLLING FILTER, EXHAUST EMISSION CONTROLLING METHOD AND DEVICE

(75) Inventors: Yasuyoshi Kato, Kure (JP); Takashi Michimoto, Kure (JP); Eiji Miyamoto, Kure (JP); Naomi Imada, Kure (JP); Masatochi Fujisawa, Kure (JP); Kazuki Kobayashi, Kure (JP); Hiroshi Ishizaka, Kure (JP); Takeshi Hirota, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 314 days.

(21) Appl. No.: 10/580,506

(22) PCT Filed: Nov. 24, 2004

(86) PCT No.: PCT/JP2004/017395

§ 371 (c)(1),
(2), (4) Date: Jan. 26, 2007

(87) PCT Pub. No.: WO2005/052327

PCT Pub. Date: Jun. 9, 2005

(65) Prior Publication Data

US 2007/0128089 A1 Jun. 7, 2007

(30) Foreign Application Priority Data

Nov. 25, 2003 (JP) .............................. 2003-393879
Mar. 30, 2004 (JP) .............................. 2004-099149

(51) Int. Cl.
 *B01D 39/00* (2006.01)
(52) U.S. Cl. ........................... 55/521; 55/524; 123/518; 123/519; 95/146; 96/108

(58) Field of Classification Search ................... 55/521, 55/524; 123/518, 519; 95/146; 96/108
See application file for complete search history.

(56) References Cited

U.S. PATENT DOCUMENTS 5,746,989 A * 5/1998 Murachi et al. .......... 423/213.7
2004/0020359 A1 * 2/2004 Koermer et al. ................ 95/113

FOREIGN PATENT DOCUMENTS

| JP | 11294138 A | * | 10/1999 |
| JP | 2001149451 A | * | 6/2001 |
| JP | 2001276573 A | * | 10/2001 |

OTHER PUBLICATIONS

Translation of JP 2001276573 A, Oct. 2001. Japan. Yajima, Yuji.*
Translation of JP 20011276573 A, Oct. 2001. Japan. Yajima, Yuji.*
Translation of JP 11294138 A, Oct. 1999. Japan. Gomyo et al.*
Translation of JP 2001149451 A, Jun. 2001. Japan. Hioki, Shinya.*

* cited by examiner

*Primary Examiner*—Robert J Hill, Jr.
*Assistant Examiner*—Christopher P Jones
(74) *Attorney, Agent, or Firm*—Fay Sharpe LLP (57) ABSTRACT

A particulate matter-removing filter being resistant to clogging and ash blocking, requiring no special means such as back-washing and heating combustion, and being formed of inexpensive materials; and exhaust emission controlling method and device using this. (1) A particulate-matter-containing exhaust emission controlling filter which uses as a basic unit a pair of porous corrugated sheet and a porous flat sheet that support an exhaust emission controlling catalyst, has a molding formed by laminating the porous corrugated sheets so that their ridge lines alternately cross perpendicularly, has one of side surfaces, perpendicularly crossing the corrugated sheet ridge lines, of the molding or mutually-adjoining two surfaces that are the perpendicularly-crossing side surfaces sealed, and has exhaust gas in-flow passage and out-flow passage respectively formed between porous corrugated sheets via a porous flat sheet. (2) A filter having the exhaust emission controlling catalyst that is an oxidizing catalyst for oxidizing nitrogen monoxide in an exhaust gas.

16 Claims, 6 Drawing Sheets

GAS TO BE TREATED

[FIG. 1]

GAS TO BE TREATED

CLEANED GAS

PARTICULATE MATTER-CONTAINING EXHAUST EMISSION CONTROLLING FILTER, EXHAUST EMISSION CONTROLLING METHOD AND DEVICE

TECHNICAL FIELD

The present invention relates to a particulate matter-containing exhaust emission controlling filter that can remove particulate matter (PM) contained in the gas exhausted from, particularly, a diesel engine with a low draft loss in a highly efficient manner, and can remove deposits without using large-scaled equipment when ashes and soot are accumulated, and to a PM-containing exhaust gas purifying method and a device using the filter.

BACKGROUND ART

A diesel engine (DE) is one of the most efficient internal combustion engines, as it is reduced in the discharge of carbon dioxide ($CO_2$) per certain output and economical so as to be able to use a low-quality fuel such as heavy oil. There is a tendency that the diesel engines are frequently used to prevent global warming. This is because it is reconsidered that cars and a stationary generator using a diesel engine have high-energy efficiency with small amount of discharge of carbon dioxide ($CO_2$).

However, a lot of particulate matter (PM) in which unburned hydrocarbons are united with soot is discharged from these diesel engines using heavy oil or light gas oil as its fuel to be the main cause behind the pollution and a social problem. Various industries such as diesel engine makers and car makers undergo researches into and developments in the removal of PM and have made studies and inventions concerning filters having excellent ability of removing PM, pre-filter oxidation catalysts and DP (Diesel Particulate) filters (DPF) so devised that the filter is made to carry an oxidation catalyst to oxidize nitrogen monoxide (NO) in exhaust gas into nitrogen dioxide ($NO_2$) to burn soot, in order to prevent or retard clogging with soot for a long period of time (Non-Patent Document 1, for example).

Many of these technologies intend to filter exhaust gas by passing it through a thin wall which is porous ceramics several μm in size. Plate or cylindrical filters obtained by calcining metals or ceramics, filters using a honeycomb ceramic porous molded body of which the meshes are alternately filled up and filters using fine metal wire woven fabrics are known. Also, filters obtained by providing these filters with the ability of oxidizing NO into $NO_2$ to oxidize and burn soot with the intention of preventing or limiting clogging of these filters (Patent Documents 1 and 2 and Non-Patent Document 2, for example).

Non-Patent Document 1: Japan Environmental Management Association for Industry, Environmental Management Vol. 37, p 441-449

Patent Document 1: Publication of Japanese Patent Application Laid-Open No. 1-318715

Patent Document 2: Publication of Japanese Patent Application Laid-Open No. 60-235620

Non-Patent Document 2: Society of Automotive Engineers of Japan Academic Lecture Publisher No. 22-2

DISCLOSURE OF THE INVENTION

Problems to be Solved by the Invention

The aforementioned conventional technologies have high DP calcining efficiency and superior performances. These technologies, however, have the following problems in the case of the exhaust gas using light oil or heavy oil as a fuel and in the case of applying these technologies to stationary generators using DE. (i) These filters are operated based on the fundamental principle that PM is removed by filtration utilizing fine pores and therefore have a large draft loss, and often impair the characteristics of DE having high efficiency. (ii) Many of these filters tend to cause clogging in the case where a large amount of soot is generated by unsuitable operations and eventually need measures against clogging, for example, back-washing of the filter, or heating and burning of soot, to prevent clogging. (iii) Ashes in a fuel are accumulated in pores of the filter to cause clogging, which decreases the life of the filter. (iv) In the case where no denitrating apparatus is provided in a downstream of an exhaust gas, $NO_2$ which has not been consumed to burn soot is emitted, causing the problem that the generation of yellow smokes and secondary pollution occur.

It is an object of the present invention to solve the above problem of conventional art and to provide a particulate matter removing filter which is structured by an inexpensive material, is resistant to clogging or closure by ashes and needs no special means such as back-washing, or heating and burning of soot. The present invention has also an object of providing an exhaust gas purifying method and a device using the above filter.

Means for Solving the Problems

The inventions to be claimed in the patent application of this case to attain the above objects are as follows.

(1) A particulate-matter-containing exhaust gas purifying filter which uses, as a basic unit, a pair of porous corrugated plate and a porous flat plate that support an exhaust gas purifying catalyst, has a molding formed by stacking up the pairs of the porous corrugated plate and the porous flat plate such that the ridge lines of the porous corrugated plates alternately cross perpendicularly, and one of side surfaces perpendicularly crossing said corrugated plate ridge lines, of the molding or mutually-adjoining two surfaces that are the perpendicularly-crossing side surfaces are sealed, so that exhaust gas in-flow passage and out-flow passage are respectively formed between said porous corrugated plates via the porous flat plate.

(2) The filter according to the above (1), wherein said exhaust gas purifying catalyst is an oxidizing catalyst that oxidizes nitrogen monoxide in the exhaust gas.

(3) The filter according to the above (1) or (2), wherein said oxidizing catalyst contains platinum.

(4) The filter according to any of the above (1) to (3), wherein said oxidizing catalyst contains titanium oxide.

(5) A particulate matter-containing exhaust gas purifying method using the filter according to any of the above (1) to (4), comprising introducing the exhaust gas into said filter from the passage along the ridge line of the corrugated plate which passage is formed between the porous corrugated plate and porous flat plate of the molded body, allowing the gas cleaned in the passage to pass through the porous flat plate and the porous corrugated plate, and then discharging the gas from adjacent passages along the ridge lines of adjacent corrugated plates which passages are formed between porous flat plates and the porous corrugated plates and crosses at right angles with said passage along the ridge line of the corrugated plate.

(6) A particulate matter-containing exhaust gas purifying device comprising the filter as claimed in the above (1), a means for introducing exhaust gas into said exhaust gas in-flow passage of the filter and a means for interrupting the passage of the gas discharged from said out-flow passage.

(7) The gas purifying device according to the above (6), wherein said means for interrupting the passage of the gas has a structure having the switching function of permitting or interrupting the passage of the gas.

(8) A particulate matter-containing exhaust gas purifying filter having a molded body provided with, as a basic unit, a pair of a porous corrugated plate and a porous flat plate, formed by stacking up the basic units on each other such that the ridge lines of the porous corrugated plates alternately cross perpendicularly wherein one of the surfaces crossing perpendicularly with said corrugated plate ridge line of the molded body or two surfaces that are side surfaces crossing perpendicularly with said corrugated plate ridge line and are adjacent to each other are sealed to form an exhaust gas in-flow passage and an exhaust gas out-flow passage between these porous corrugated plates through said porous flat plate, and wherein an oxidizing catalyst that oxidizes nitrogen monoxide is supported on both surfaces of the porous corrugated plate and on one surface of the porous flat plate which is in contact with the porous corrugated plate, forming the exhaust gas in-flow passage and said oxidizing catalyst is supported on neither both surfaces of the porous corrugated plate nor one surface of the porous flat plate in contact with the porous corrugated plate, forming the exhaust gas out-flow passage.

(9) The filter according to the above (8), wherein said oxidizing catalyst contains platinum.

(10) The filter according to the above (8) or (9), wherein said oxidizing catalyst contains titanium oxide.

(11) A particulate matter-containing exhaust gas purifying method using the filter according to any of the above (8) to (10), comprising introducing the exhaust gas into said filter from the passage along the ridge line of the corrugated plate which passage is formed between the porous corrugated plate and porous flat plate which support the oxidizing catalyst in the molded body, and discharging the gas cleaned in the molded body from the passage along the ridge line of an adjacent corrugated plate which passage is formed between the porous plate and porous corrugated plate supporting no catalyst and which crosses perpendicularly with the passage of the ridge line of the corrugated plate.

(12) A particulate matter-containing exhaust gas purifying device comprising the filter as claimed in the above (8), a means for introducing exhaust gas into said exhaust gas in-flow passage of the filter and a means for interrupting the passage of the gas discharged from said out-flow passage are provided.

(13) The gas purifying device according to the above (12), wherein said means for interrupting the passage of the gas has a structure having the switching function of permitting or interrupting the passage of the gas.

The PM-containing exhaust gas purifying filter and exhaust gas purifying method according to the present invention can realize a DPF with a catalyst which has high performance and is reduced in pressure drop without using an expensive ceramics sintered filter which is currently used. Also, because PM can be burned and removed efficiently even if the amount of an expensive oxidizing catalyst such as Pt is significantly reduced, the cost can be remarkably reduced. Also, in the present invention, the direction of introducing exhaust gas to the exhaust gas purifying filter and the seal structure thereof are so devised as to efficiently prevent the filter from being clogged with dusts and the like.

Moreover, when among the exhaust gas passages to be alternately formed in the molded body, only the passage along the direction of exhaust gas to be introduced is made to support the oxidizing catalyst, NO in the exhaust gas in the passage after PM is removed is scarcely oxidized, thereby making it possible to prevent $NO_2$ from being discharged out of the system.

| Explanation of Reference Numerals | |
|---|---|
| 1 | Porous corrugated plate |
| 2 | Porous flat plate |
| 3 | DPF block |
| 4 | Seal material |
| 5 | Particulate matter |
| 6 | Ceramics DPF cell wall |
| 7 | Reactor |
| 8 | Flange |
| 9 | DPF support fitting |
| 10 | Valve. |

BEST MODE FOR CARRYING OUT THE INVENTION

A PM-containing exhaust gas purifying filter according to the present invention has a molded body provided with, as a basic unit, a pair of a porous corrugated plate and a porous flat plate that support an exhaust gas purifying catalyst such as an oxidizing catalyst that oxidizes NO in exhaust gas into $NO_2$, formed by stacking up the basic units such that the ridge lines of the corrugated plates of the porous corrugated plates alternately lie at right angles, wherein one of the surfaces crossing perpendicularly with the corrugated plate ridge line of the molded body or mutually-adjoining two surfaces that are the perpendicularly-crossing side surfaces are sealed.

Figure 1:
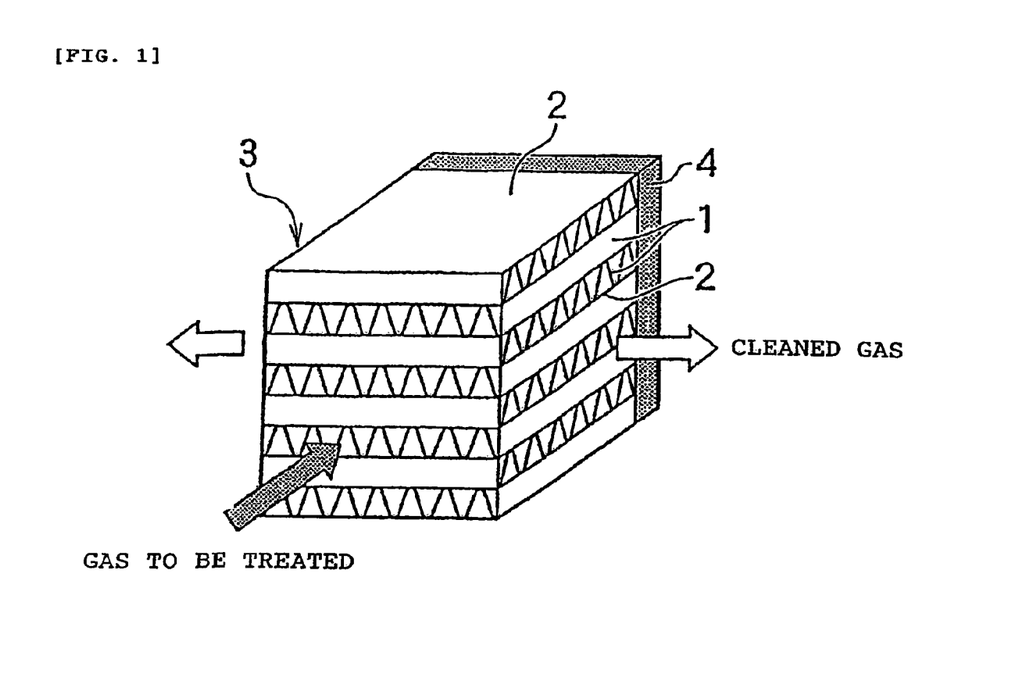
FIG. 1 is an explanatory view of an exhaust gas purifying filter showing an example of the present invention.
Figure 2:
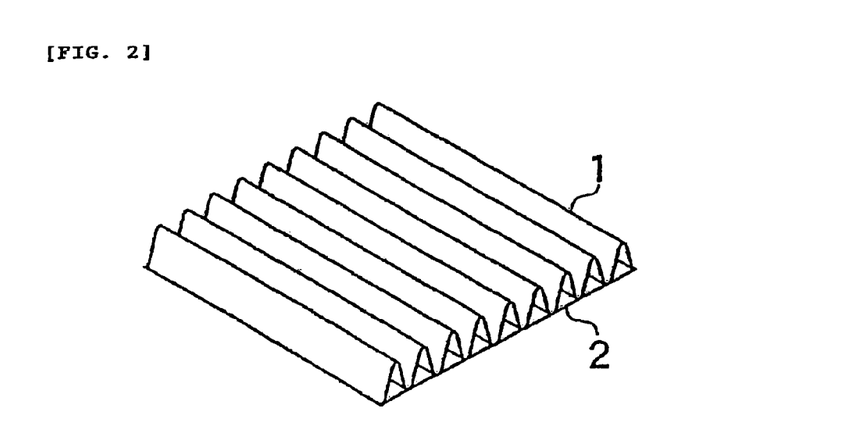
FIG. 2 is an explanatory view of a basic unit consisting of a porous corrugated plate and a porous flat plate.
Figure 3:
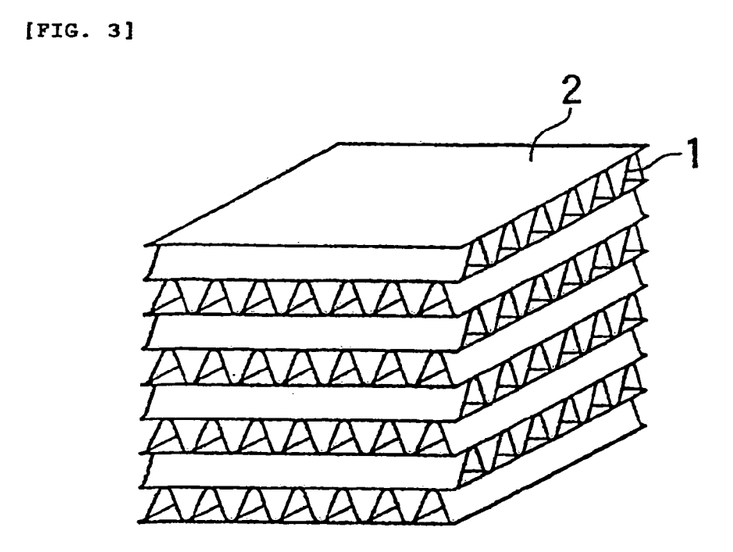
FIG. 3 is an explanatory view of a DPF block used in the present invention.

FIG. 1 is an explanatory view of the particulate matter removing filter (DPF) showing an embodiment of the present invention. FIG. 2 is an explanatory view of a basic unit consisting of a porous corrugated plate and a porous flat plate used in the present invention. FIG. 3 is an explanatory view of the molded body in which the basic units are stacking up.

Figure 4:
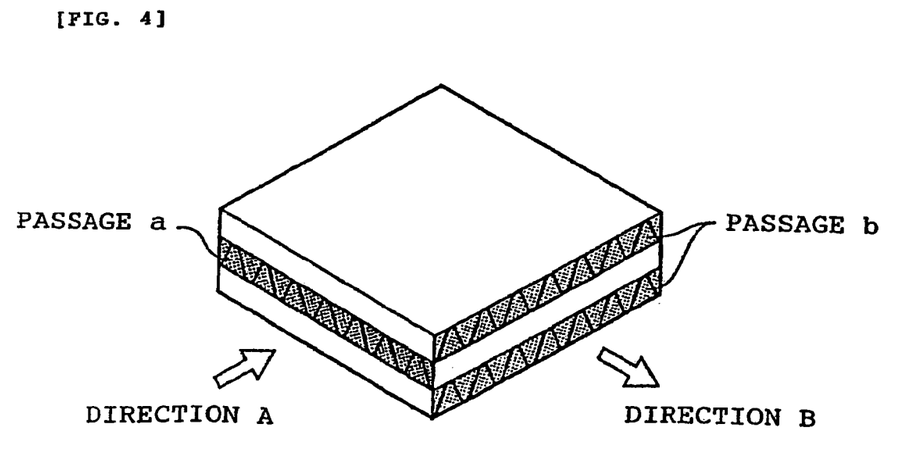
FIG. 4 is an explanatory view of an in-flow passage and out-flow passage of exhaust gas in the present invention.

In FIG. 1, the DPF is provided with a block molded body (here, referred to as a DPF block) 3 and a seal material 4. The DPF block 3 is constituted such that plural basic units consisting of a pair of a porous corrugated plate 1 and a porous flat plate 2 as shown in FIG. 2, are stacked up such that the ridge lines of the porous corrugated plates 1 alternately lie at right angles as shown in FIG. 3. A seal material 4 is provided on one of the side surfaces of the block 3 which side surfaces cross the ridge line of the porous corrugated plate 1 constituting the DPF block 3 perpendicularly. Thus, as in-flow passage a for exhaust gas (gas to be treated) and a gas out-flow passage b (cleaned gas) are formed between the seal material 4 and the porous corrugated plate 1 through the porous flat plate 2 (FIG. 4).

In the present invention, as materials of the porous corrugated plate 1 and porous flat plate 2, nonwoven or woven fabrics using a silica alumina type ceramics fiber, metal fiber sheets or porous sintered bodies of ceramics such as cordierite are used, for example. Among these materials, a ceramics nonwoven fabric (sheet) having a thickness of 0.5 to 0.1 mm is particularly preferably used from the viewpoint of obtaining a light DPF having high porosity. Though no particular limitation is imposed on the shape of the corrugated plate of the porous corrugated plate 1, the pitch and height of the wave are preferably designed to be in a range from 2 to 10 mm and a range from 1 to 5 mm respectively in the case of using the above plate thickness. As to the shape of the basic unit consisting of the porous wave plate 1 and the porous flat plate 2, both plates are preferably bound with each other by an inorganic binder though they may be simply stacked.

With regard to the seal material, no particular limitation is imposed on the material including its seal structure insofar as it can inhibit the flowing passage of exhaust gas on the surface opposite to the surface from which the exhaust gas is introduced along the ridge line of the corrugated plate of the porous corrugated plate 1. Means such as a method in which the flow passages on the surface to be sealed are plugged with an inorganic solidified material, a method in which the flow passage is applied an inorganic fiber mat-like seal material under pressure, or a method in which the flow passage is plugged with, a metal plate, may be adopted. Also, a material prepared by impregnating an inorganic fiber mat with a highly bonding adhesive such as a ceramics adhesive having a high viscosity may be used to cover the periphery of the DPF block and integrated with a support cell wall of the DPF block, thereby forming a highly strong seal material.

It is necessary that the porous corrugated plate 1 and the porous flat plate 2 are supported with an exhaust gas purifying catalyst, in particular, an oxidation catalyst component that oxidizes NO contained in exhaust gas into $NO_2$ in said exhaust gas passage at least on the exhaust gas introduction side thereof. As the catalyst component, a known catalyst prepared by allowing a usual noble metal such as platinum (Pt) to be supported on a support having a large surface area such as titania, alumina, zirconia or silica may be used. It is particularly preferable to use titania having high acid resistance, when an exhaust gas after burning heavy oil having high sulfur content is treated.

Figure 5:
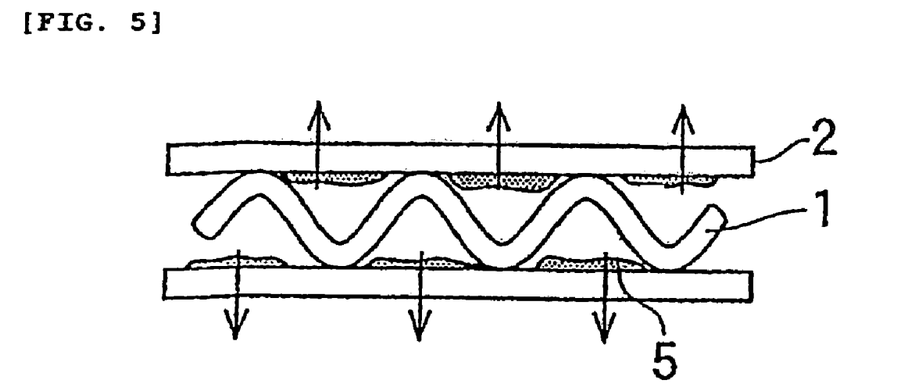
FIG. 5 is a view for explaining the accumulation of particulate matter in a DPF according to the present invention.

In order to purifying exhaust gas by using the DPF of the present invention, gas to be treated is supplied along the ridge line of a corrugated plate through the passage formed between the porous corrugated plate 1 and porous flat plate 2 of the DPF block 3. Specifically, as shown in FIG. 4, a passage a along the direction A, which is formed between the porous corrugated plate 1 and porous flat plate 2, and a passage b along the direction B perpendicular to the direction A are formed in the DPF. The gas to be treated introduced from the direction A can be introduced only into the passage a (exhaust gas in-flow passage), meanwhile the gas introduced into the passage a passes through pores in the porous flat plate 2 and moves to the passage b (exhaust gas out-flow passage) along the direction B which is formed by the porous flat plate 2, another porous corrugated plate 1 adjacent to the porous flat plate 2 and another porous flat plate 2, since the exit part of the passage a is sealed by the seal material 4. When the exhaust gas passes through the porous flat plate 2, PM contained in the gas is removed by filtration and is accumulated on the surface of the porous flat plate 2. An explanatory view of the state of the accumulated PM is shown in FIG. 5. In FIG. 5, the symbol 5 shows the accumulated PM (particulate matter).

Further, when the gas to be treated is brought into contact with the porous corrugated plate 1 and porous flat plate 2, NO in the gas to be treated is oxidized into $NO_2$ by the catalyst having an oxidizing activity which is supported by these plates. The PM (soot) accumulated is oxidized into $CO_2$ by the action of $NO_2$ according to the following formula (1), then to be removed. It is therefore possible to prevent such troubles that the porous corrugated plate 1 and the porous flat plate 2 are increased in pressure drop with time, or clogged by the accumulated PM.

$$2NO_2+C(soot) \rightarrow CO_2+2NO \quad (1)$$

Figure 6:
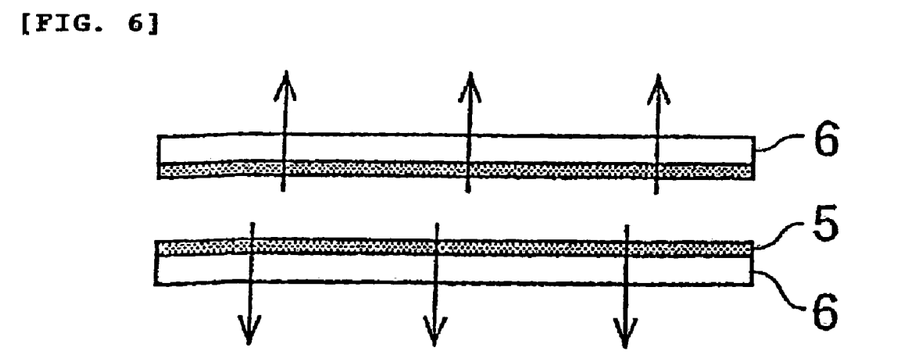
FIG. 6 is a view for explaining the accumulation of particulate matter in a conventional DPF.

In the DPF of the present invention, as shown in FIG. 5, no PM is accumulated on the surface of the porous corrugated plate 1 in the passage a. Therefore, NO in the gas can be efficiently brought into contact with the porous corrugated plate 1 positioned upstream of the porous flat plate 2 on which PM is accumulated, leading to efficient generation of $NO_2$. Accordingly, the PM accumulated on the surface of the porous flat plate 2 can be oxidized by the $NO_2$ and removed in an efficient manner. Therefore, even if the amount of the catalyst supported on the porous corrugated plate 1 and porous flat plate 2 and the amount of the expensive noble metal to be used are reduced, it is possible to proceed the oxidation of PM sufficiently to always reduce the amount of the deposit soot, making possible a low-pressure drop operation of the DPF. It is to be noted that in the conventional DPFs formed by plugging passages of a honeycomb molded body alternately, efficient combustion of soot cannot be attained, because $NO_2$ is generated at the lower part of the accumulated soot as shown in FIG. 6.

The gas from which soot is removed by filtration moves to the passage b which constitutes of the porous corrugated plate 1 and porous flat plate 2 which support the NO oxidizing catalyst. NO gas in the passage b is also oxidized into $NO_2$. Therefore, when a denitrating catalyst for reducing $NO_x$ in the presence of urea or $HH_3$ exists at downstream of the passage b, a denitrating reaction of the following formula (2) that runs at a very high rate proceeds preferentially. $NO_x$ in the exhaust gas is removed very efficiently even at low temperatures, to enhance denitrating capability of the system.

$$NO+NO_2+2NH_3 \rightarrow 2N_2+3H_2O \quad (2)$$

In the present invention, the oxidizing catalyst that oxidizes NO in the exhaust gas into $NO_2$ may be supported on all the porous corrugated plate 1 and the porous flat plate 2 which constitute the block. However, the catalyst may be supported only in the passage a constituting the exhaust gas in-flow passage, specifically, on both surfaces of the porous corrugated plate 1 constituting the exhaust gas in-flow passage and on one surface of the porous flat plate 2 that is in contact with the porous corrugated plate 1.

In the former case where the oxidizing catalyst is supported on all the porous corrugated plate 1 and the porous flat plate 2, NO in the exhaust gas from which PM is removed is oxidized also in the passage b. Therefore, in the case where no denitrating device is provided at downstream of the filter, highly toxic $NO_2$ generated is emitted in the air as it is, which may cause a problem that secondary pollution, generation of yellow smokes and the like occur. In this case, it is preferable that like the latter case, only the passage a constituting the exhaust gas our-flow passage be made to support the oxidizing catalyst and the passage b constituting the exhaust gas out-flow passage be made to support no oxidizing catalyst. Such a structure limits the oxidation of NO into $NO_2$ in the passage b, so that the discharge of $NO_2$ out of the system is prevented.

When the oxidizing catalyst is not supported inside of the passage b, the support may be used as it is if the porous corrugated plate 1 and the porous flat plate 2 are highly rigid. However, in the case of improving the strength of the support, a slurry or sol of an inactive oxide of titania, alumina or zirconia may be supported as a reinforcement on both surfaces of the porous corrugated plate 1 and on each one surface of the porous flat plates 2 that are in contact with the porous corrugated plate 1.

The inside surface of the passage a can be made to support the catalyst component and the inside surface of the passage b can be made to support the above reinforcement easily by introducing the catalyst component slurry from the direction of A in FIG. 4 and withdrawing the slurry from the opposite direction and also by introducing the reinforcement slurry from the direction of B in FIG. 4 and withdrawing the slurry from the opposite direction. In this case, it is preferable to protect the surface of the passage into which the slurry is not introduced by masking the surface with, for example, a seal material. Also, a method may be adopted in which the above components are supported including or applying these components to the support when the basic unit of the support is manufactured as shown in FIG. 2, the resulting basic units then being stacked.

Figure 7:
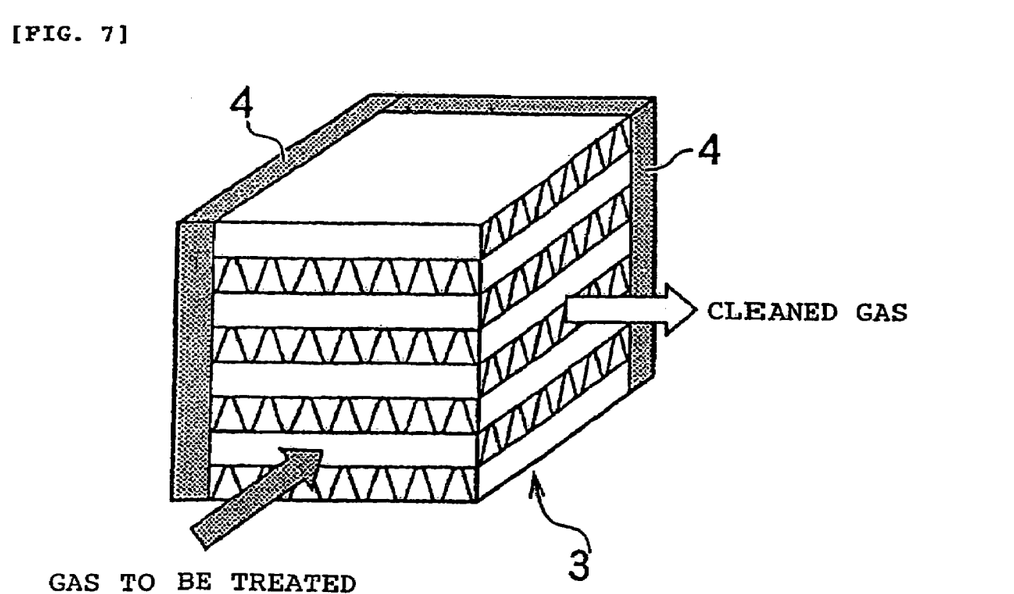
FIG. 7 is an explanatory view of an exhaust gas purifying filter showing another example of the present invention.

FIG. 7 is an explanatory view of a DPF showing another example of the present invention. In FIG. 7, the DPF is different from that in FIG. 1 in that the seal material 4 is disposed on two adjacent surfaces which are side surfaces perpendicular to the ridge line of the corrugated plate of the DPF block 3. Such a structure ensures that the gas to be treated which gas is introduced into the DPF block 3 can be discharged in one direction and therefore the dead space in the reactor into which the DPF is incorporated is reduced, thereby making a compact exhaust gas purifying device.

Figure 8:
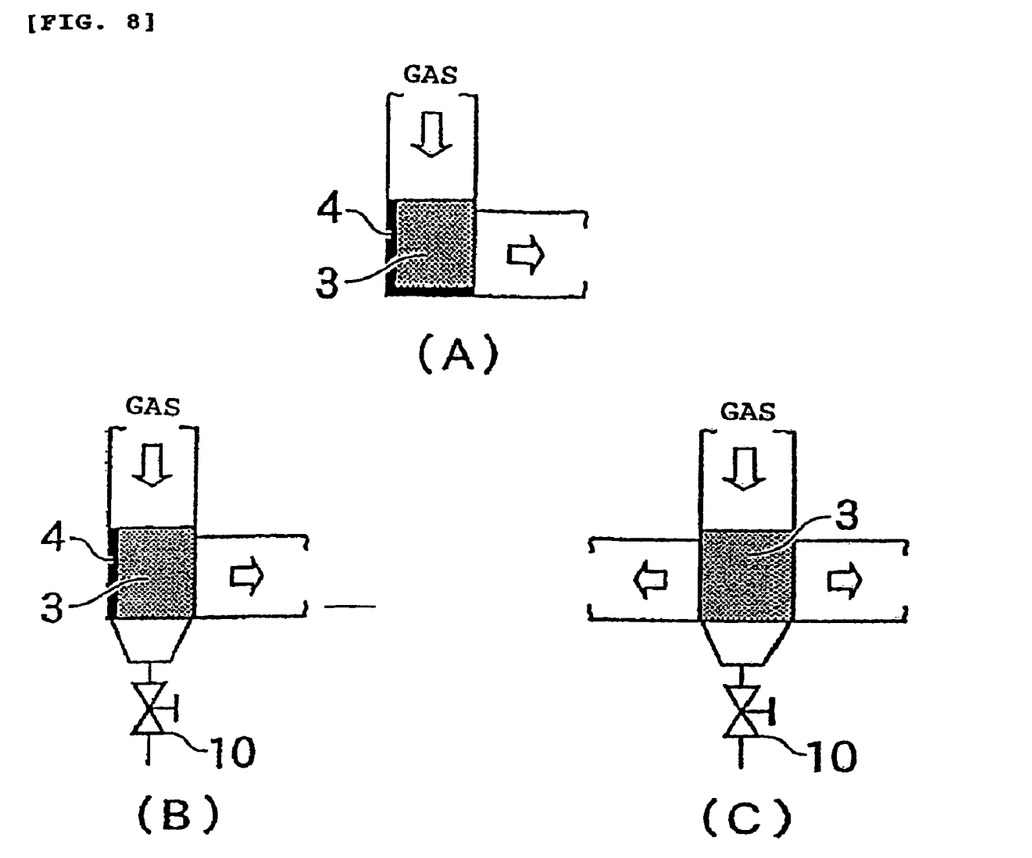
FIG. 8 is an explanatory view of a reactor into which the DPF of the present invention is incorporated.

FIG. 8 is an explanatory view showing various examples of the arrangement of the DPF of the present invention when the DPF is incorporated into a reactor. FIG. 8(A) is an explanatory view of the reactor into which the DPF provided with the seal material 4 on both surfaces of the DPF block 3 and FIGS. 8(B) and 8(C) are explanatory views of a reactor provided with a valve 10 that cut off the passage of exhaust gas on the side opposite to the surface that introduces the exhaust gas. In FIG. 8(B), two planes are sealed by a combination of the seal material 4 and valve 10, while in FIG. 8(C), only one surface is sealed by the valve 10. When the valve 10 is disposed to seal, the exhaust gas can be passed or stopped under control by switching on and off the valve 10. Therefore, when the passage is clogged with soot (PM) exceeding the soot oxidizing ability of the DPF due to misoperations or engine troubles, the valve 10 is opened to discharge the gas, whereby the accumulated soot can be withdrawn to restore the operation to its original state promptly.

EXAMPLES

The present invention will be explained in more detail by way of examples, which are, however, not intended to limit the present invention.

Example 1

A stacked block of a 0.2-mm-thick porous corrugated plate and a 0.2-mm-thick porous flat plate made of a nonwoven fabric of silica alumina fibers (cross corrugated honeycomb manufactured by NICHIAS Corporation, corrugated plate pitch: 3.3 mm, interval between flat plates: 1.9 mm, external dimension: 300 mm×300 mm×300 mm) was impregnated with a 15% $TiO_2$ sol (manufactured by Ishihara Sangyo Co., Ltd.), drained off by air blowing and dried at 150° C. Then, the stacked block was impregnated with a dinitrodiammineplatinum solution (Pt concentration: 1.33 g/L), dried again and calcined at 600° C. to manufacture a base material for a DPF supporting an oxidizing catalyst containing 0.2 g/L of Pt.

Example 2

A base material for a DPF with an oxidizing catalyst was manufactured in the same manner as in Example 1 except that the concentration of dinitrodiammineplatinum was altered from 1.33 g/L to 0.32 g/L in Example 1.

Example 3

A slurry prepared by suspending 300 g of a $TiO_2$ powder (trade name: G5 manufactured by Millennium Pharmaceuticals, Inc., surface area: 320 $m^2/g$) in a dinitrodiammineplatinum solution (Pt content: 1.7 g/L) was kept at 80° C. for 2 hours to make a Pt component adsorb to the surface of $TiO_2$. 1 kg of colloidal silica (trade name: Silica sol-OS, manufactured by Nissan Chemical Industries, Ltd., concentration of $SiO_2$: 20%) was added to 1 kg of the resulting solution and the pH of the solution was adjusted by a nitric acid solution to obtain a catalyst slurry to be supported in the passage a.

A 0.2-mm-thick cross corrugated honeycomb made of a nonwoven fabric of silica alumina fibers (manufactured by NICHIAS Corporation, corrugated plate pitch: 3.3 mm, interval between flat plates: 1.9 mm, external dimension: 300 mm×300 mm×300 mm) was prepared. Using a method in which the slurry was introduced into one surface from the direction of A of FIG. 4 and then discharged from the opposite surface, the catalyst component was supported only in the internal surface of the passage a, drained off by air blowing, dried at 150° C. and calcined at 600° C. to manufacture a base material for a DPF sipporing an oxidizing catalyst containing 0.1 g/L of Pt.

Example 4

A slurry prepared by suspending 300 g of a $TiO_2$ powder (trade name: G5 manufactured by Millennium Pharmaceuticals, Inc., surface area: 320 $m^2/g$) in a dinitrodiammineplatinum solution (Pt content: 1.7 g/L) was kept at 80° C. for 2 hours to make a Pt component adsorb to the surface of $TiO_2$. 1 kg of colloidal silica (trade name: Silica sol-OS, manufactured by Nissan Chemical Industries, Ltd.) was added to 1 kg of the resulting solution and the pH of the solution was adjusted by a nitric acid solution to obtain a catalyst slurry to be supported in the passage a.

Separately, 1 kg of colloidal silica (trade name: Silica sol-OS, manufactured by Nissan Chemical Industries, Ltd., concentration of $SiO_2$: 20%) was added to 1 kg of a slurry prepared by suspending 300 g of a $TiO_2$ powder (trade name: CR50, manufactured by Ishihara Sangyo Co., Ltd., surface area: 3 $m^2/g$) and the pH of the solution was adjusted by a nitric acid solution to obtain an inactive inorganic oxide slurry to be supported in the passage b.

A 0.2-mm-thick cross corrugated honeycomb made of a nonwoven fabric of silica alumina fibers (manufactured by NICHIAS Corporation, corrugated plate pitch: 3.3 mm, interval between flat plates: 1.9 mm, external dimension: 300 mm×300 mm×300 mm) was prepared. Using a method in which the above slurry for the passage a was introduced into a surface from the direction of A of FIG. 4 and discharged from the opposite surface, the catalyst component was supported only in the internal surface of the passage a, drained off by air blowing, dried at 150° C. Thereafter, using a method in which the above slurry for the passage b was introduced into a surface from the direction of B of FIG. 4 and discharged from the opposite surface, the inactive oxide was supported in the internal surface of the passage b, drained off by air blowing, dried at 150° C. and calcined at 600° C. to manufacture a base material for a DPF with an oxidizing catalyst.

Example 5

A base material for a DPF with an oxidizing catalyst was manufactured in the same manner as in Example 4 except that the catalyst slurry prepared for the passage a was made to flow into the passage b in place of the inactive component slurry to be flowed into the passage b to support the catalyst, thereby making the passages a and b support a NO-oxidizing component.

Comparative Example 1

A commercially available DPF (manufactured by Hitachi Metals, Ltd., cell number 100 cpsi, 5.66 inch φ×6 inch length) made of cordierite ceramic which was manufactured by alternately plugging opening parts of the passages of a honeycomb molded body was impregnated with a titania sol (manufactured by Ishihara Sangyo Co., Ltd., $TiO_2$ content: 30%), followed by draining off by a centrifuge to support 60 g/L of $TiO_2$. After the DPF impregnated with the titania sol was dried at 150° C., it was further impregnated with a dinitrodiammineplatinum acid solution such that the amount of Pt to be supported was 1.6 g/L based on the DPF, dried and then calcined at 600° C. for 2 hours to manufacture a DPF with a catalyst.

Comparative Example 2

A base material for a DPF with a catalyst was manufactured in the same manner as in Comparative Example 1 except that the concentration of dinitrodiammineplatinum was diluted to 1/8 to decrease the amount of platinum to be supported to 0.2 g/L.

Test Example

Figure 9:
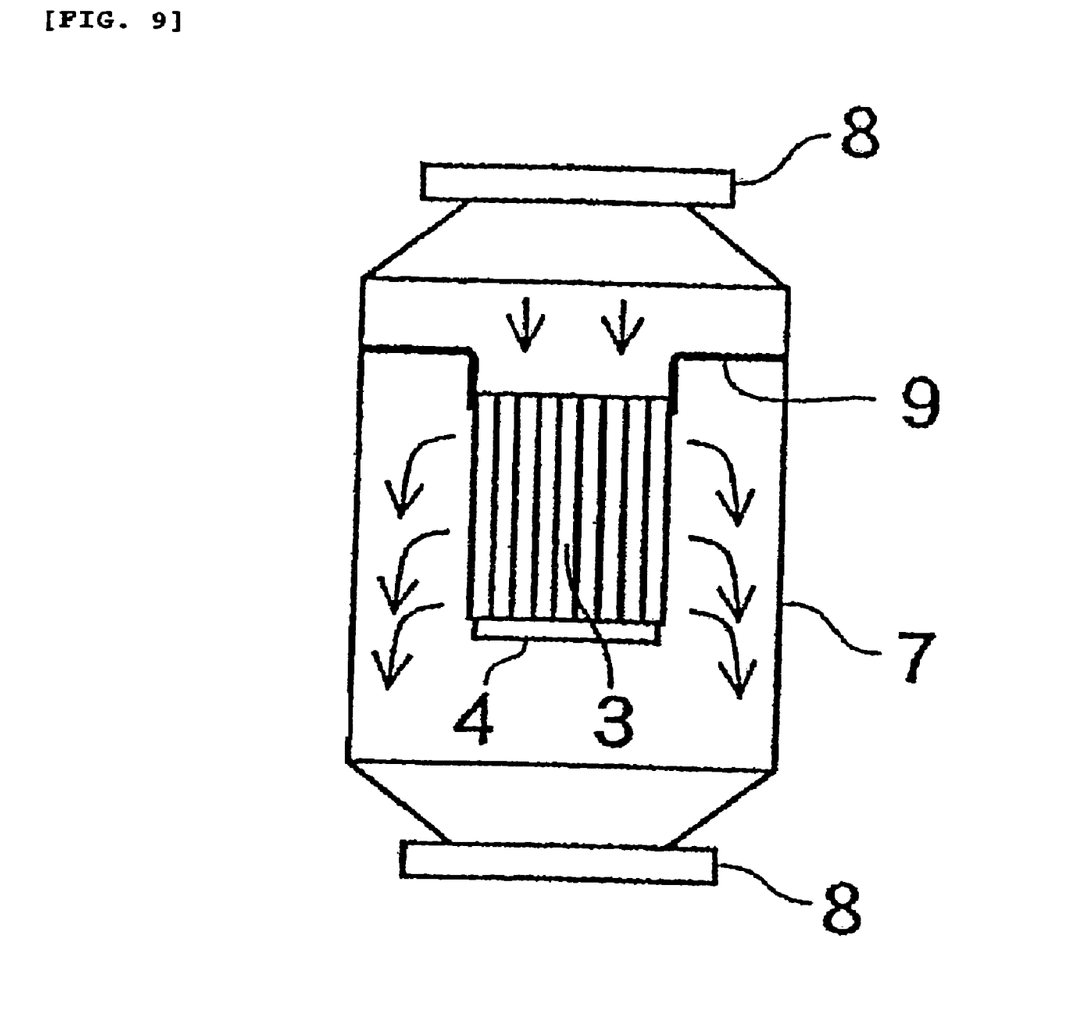
FIG. 9 is an explanatory view of a reactor into which the DPF used in the example is incorporated.

Each base material for a DPF with an oxidizing catalyst obtained in Examples 1 to 5 was cut into a 150-mm-long, 150-mm-high and 117-mm-wide rectangular parallelepiped and one of the surfaces thereof was sealed with a seal material. The base material (DPF block) was filled in a reactor shown in FIG. 9 such that one of the remainder unsealed surfaces faced upward (gas supply side). That is, the DPF block 3 was fixed to a DPF support fitting 9 disposed in the reactor 7 such that the unsealed surface faced upward. Also, each DPF block with a catalyst obtained in Comparative Examples 1 and 2 was filled in a cylindrical reactor with sealing the periphery of the DPF block and the reactor.

Each of these reactors was disposed at the exit of a diesel engine using A-heavy oil as a fuel, and the exhaust gas discharged from the engine was allowed to flow out at a rate of 100 $m^3$/h to examine the following items. The results are shown in Table 1.

(1) Presence of black smoke at the start of the engine.

(2) Presence of a rise in the pressure drop in a low-load operation (DPF temperature: about 300° C.).

(3) Pressure drop and presence of a rise in the pressure drop in a 100% rated operation (DPF temperature: about 400° C.).

(4) Concentration of particulate matter at the inlet and exit of the DPF in a 100% rated operation.

(5) Concentration of $NO_2$ at the exit of the DPF in a 100% rated operation.

TABLE 1

| | Amount of Pt supported (g/L) | Visual observation of black smoke at the start | Rise in pressure drop in a low-load operation | Condition when a 100% load is applied | | PM removal rate (%) | $NO_2$ concentration at the exit of the DPF (ppm) |
|---|---|---|---|---|---|---|---|
| | | | | Pressure drop (mm$H_2O$) | Presence of a rise in pressure drop with time | | |
| Example 1 | 0.2 | None | A little | 140 | None | 90 or more | — |
| Example 2 | 0.05 | None | A little | 140 | None | 90 or more | — |
| Example 3 | 0.1 | None | A little | 140 | None | 90 or more | 40 |
| Example 4 | 0.1 | None | A little | 150 | None | 90 or more | 30 |
| Example 5 | 0.2 | None | A little | 140 | None | 90 or more | 80 |
| Comp. ex. 1 | 1.6 | None | A little | 160 | None | 90 or more | 220 |
| Comp. ex. 2 | 0.2 | None | Sharp rise, Clogged in 2 hours | 320 | Rise in pressure by 40 mm$H_2O$ in 5 hours | 90 or more | 80 |

The obtained results are shown in Table 1, from which it has been found that the DPF with an oxidizing catalyst according to the present invention enables soot to be burned efficiently even if the amount of catalyst Pt is significantly small and can also suppress its pressure drop to a low level.

It has been found from Table 1 that the DPF with an oxidizing catalyst which are obtained in Examples 1 to 5 of the present invention enables soot to be burned more efficiently even if the amount of catalyst Pt is significantly small and can also suppress its pressure drop to a lower level than the DPFs obtained in Comparative Examples. Also, it is understood that since the oxidizing catalyst is not supported in the passage b (exhaust gas out-flow passage) in Examples 3 and 4, the concentration of $NO_2$ at the exit of the DPF is limited to a lower level, showing that these DPFs of the present invention are environmentally superior. In the case of the DPF with the oxidizing catalyst of Example 5, in turn, the concentration of $NO_2$ at the exit of the DPF is increased since the oxidizing catalyst is supported in the entire exhaust gas passage. However, in this case, $NO_2$ can be prevented from emitting out of the system by disposing a denitrating catalyst device at downstream of the DPF.

On the contrary, the conventional ceramics DPFs obtained in Comparative Examples 1 and 2 are increased in pressure drop and also increased in the concentration of $NO_2$ at the exit of each DPF.

INDUSTRIAL APPLICABILITY

According to the present invention, particulate matter contained in gas exhausted from, particularly, a diesel engine can be removed with a low draft loss and high efficiency and also when ashes and soot are accumulated, they can also be removed without using large-scaled equipment, which ensures that an inexpensive DPF useful to prevent environmental air pollution can be provided and therefore the DPF of the present invention produces a large social and economical effect.

The invention claimed is:

1. A filter for purifying an exhaust gas containing particulate matter and nitrogen monoxide, comprising: a molding formed by stacking up pairs of a porous corrugated plate and a porous flat plate such that the ridge lines of the porous corrugated plates alternately cross perpendicularly, and either one side surface or two mutually-adjoining surfaces of the molding are sealed, and perpendicularly-crossing said porous corrugated plate ridge lines so that exhaust gas in-flow passages and exhaust gas out-flow passages are respectively formed between said porous corrugated plates via the porous flat plates; and wherein an exhaust gas purifying catalyst is supported on the porous corrugated plates and the porous flat plates to form said exhaust gas in-flow passages, said catalyst being an oxidizing catalyst which oxidizes nitrogen monoxide in the exhaust gas to nitrogen dioxide which then oxidizes the particulate matter deposited on the porous flat plates to carbon dioxide and nitrogen monoxide, wherein the nitrogen monoxide further reacts with nitrogen dioxide and ammonia to produce nitrogen gas and water.

2. The filter according to claim 1, wherein said oxidizing catalyst contains platinum.

3. The filter according to claim 2, wherein said oxidizing catalyst contains titanium oxide.

4. The filter according to claim 1, wherein said oxidizing catalyst contains titanium oxide.

5. The filter according to claim 1 comprising a means for introducing exhaust gas into said exhaust gas in-flow passage of the filter and a means for interrupting the passage of the gas discharged from said out-flow passage.

6. The filter according to claim 5, wherein said means for interrupting the passage of the gas has a structure having the switching function of permitting or interrupting the passage of the gas.

7. A filter for purifying an exhaust gas containing particulate matter and nitrogen monoxide comprising: a molding formed by stacking up pairs of a porous corrugated plate and a porous flat plate such that the ridge lines of the porous corrugated plates alternately cross perpendicularly, and either one side surface or two mutually-adjoining surfaces of the molding are sealed, and perpendicularly crossing said corrugated plate ridge lines so that exhaust gas in-flow passages and exhaust gas out-flow passages are respectively formed between said porous corrugated plates through said porous flat plates, and wherein an oxidizing catalyst that oxidizes nitrogen monoxide is supported on both surfaces of the porous corrugated plate and on one surface of the porous flat plate which is in contact with the porous corrugated plate, forming the exhaust gas in-flow passage, and said oxidizing catalyst is supported on neither both surfaces of the porous corrugated plate nor one surface of the porous flat plate in contact with the porous corrugated plate, forming the exhaust gas out-flow passage, wherein the catalyst oxidizes nitrogen monoxide in the exhaust gas to nitrogen dioxide which then oxidizes the particulate matter deposited on the porous flat plates to carbon dioxide and nitrogen monoxide, wherein the nitrogen monoxide further reacts with nitrogen dioxide and ammonia to produce nitrogen gas and water.

8. The filter according to claim 7, wherein said oxidizing catalyst contains platinum.

9. The filter according to claim 8, wherein said oxidizing catalyst contains titanium oxide.

10. The filter according to claim 7, wherein said oxidizing catalyst contains titanium oxide.

11. The filter according claim 7, a means for introducing exhaust gas into said exhaust gas in-flow passage of the filter and a means for interrupting the passage of the gas discharged from said out-flow passage are provided.

12. The filter according to claim 11, wherein said means for interrupting the passage of the gas has a structure having the switching function of permitting or interrupting the passage of the gas.

13. A particulate matter-containing exhaust gas purifying method using the filter according to claim 1, comprising introducing the exhaust gas into said filter from the passage along the ridge line of the corrugated plate which passage is formed between the porous corrugated plate and porous flat plate of the molded body, allowing the gas cleaned in the passage to pass through the porous flat plate and the porous corrugated plate, and then discharging the gas from adjacent passages along the ridge lines of adjacent corrugated plates which passages are formed between porous flat plates and the porous corrugated plates and crossed at right angles with said passage along the ridge line of the corrugated plate.

14. A particulate matter-containing exhaust gas purifying method using the filter according to claim 2, comprising introducing the exhaust gas into said filter from the passage along the ridge line of the corrugated plate which passage is formed between the porous corrugated plate and porous flat plate of the molded body, allowing the gas cleaned in the passage to pass through the porous flat plate and the porous corrugated plate, and then discharging the gas from adjacent passages along the ridge lines of adjacent corrugated plates which passages are formed between porous flat plates and the porous corrugated plates and crossed at right angles with said passage along the ridge line of the corrugated plate.

15. A particulate matter-containing exhaust gas purifying method using the filter according to claim 4, comprising introducing the exhaust gas into said filter from the passage along the ridge line of the corrugated plate which passage is formed between the porous corrugated plate and porous flat plate of the molded body, allowing the gas cleaned in the passage to pass through the porous flat plate and the porous corrugated plate, and then discharging the gas from adjacent passages along the ridge lines of adjacent corrugated plates which passages are formed between porous flat plates and the porous corrugated plates and crossed at right angles with said passage along the ridge line of the corrugated plate.

16. A particulate matter-containing exhaust gas purifying method using the filter according to claim 7, comprising introducing the exhaust gas into said filter from the passage along the ridge line of the corrugated plate which passage is formed between the porous corrugated plate and porous flat plate which support the oxidizing catalyst in the molded body, and discharging the gas cleaned in the molded body from the passage along the ridge line of an adjacent corrugated plate which passage is formed between the porous plate and porous corrugated plate supporting no catalyst and which crosses perpendicularly with the passage of the ridge line of the corrugated plate.

* * * * *